(12) United States Patent
Williams

(10) Patent No.: US 10,245,980 B2
(45) Date of Patent: Apr. 2, 2019

(54) CHILD SAFETY SEAT ASSEMBLY

(71) Applicant: Wonderland Nurserygoods Company Limited, Tuen Mun, N.T. (HK)

(72) Inventor: Bruce L. Williams, Narvon, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 287 days.

(21) Appl. No.: 15/265,248

(22) Filed: Sep. 14, 2016

(65) Prior Publication Data
US 2017/0001544 A1 Jan. 5, 2017

Related U.S. Application Data

(62) Division of application No. 14/195,927, filed on Mar. 4, 2014, now Pat. No. 9,469,222.
(Continued)

(51) Int. Cl.
*B60N 2/28* (2006.01)

(52) U.S. Cl.
CPC ......... *B60N 2/2821* (2013.01); *B60N 2/2824* (2013.01); *B60N 2/2827* (2013.01);
(Continued)

(58) Field of Classification Search
CPC .. B60N 2/2821; B60N 2/2824; B60N 2/2827; B60N 2/2842; B60N 2/2848
(Continued)

(56) References Cited

U.S. PATENT DOCUMENTS 5,461,808 A 10/1995 Fritts
5,567,008 A * 10/1996 Cone, II ............... B60N 2/2821
297/183.2
(Continued)

FOREIGN PATENT DOCUMENTS

CN 1210701 A 3/1999
CN 1365906 A 8/2002
(Continued)

OTHER PUBLICATIONS

Office Action in co-pending Chinese Patent Application No. 201410075782.5 dated Nov. 24, 2015, cited in parent U.S. Appl. No. 14/195,927 (now U.S. Pat. No. 9,469,222 granted Oct. 18, 2016).
(Continued)

*Primary Examiner* — Syed A Islam
(74) *Attorney, Agent, or Firm* — Baker & McKenzie LLP

(57) ABSTRACT

A child safety seat assembly includes a support base, and a child carrier operable to detachably assemble with the support base. The support base has a shell body that defines a receiving area and includes an upright surface raising upward from a bottom surface, the shell body being assembled with a latch located adjacent to the upright surface. The child carrier includes a seat shell having a foot portion protruding downward, the foot portion having an interior in which are assembled a release arm and a fixed rod. The foot portion is placed on the bottom surface in the receiving area and the latch engages with the rod when the child carrier is locked with the support base, and the release arm is operable to push the latch to disengage from the rod for removal of the child carrier from the support base.

18 Claims, 11 Drawing Sheets

Related U.S. Application Data

(60) Provisional application No. 61/851,296, filed on Mar. 5, 2013.

(52) U.S. Cl.
CPC ......... *B60N 2/2842* (2013.01); *B60N 2/2848* (2013.01); *B60N 2/286* (2013.01); *B60N 2/2893* (2013.01)

(58) Field of Classification Search
USPC ....... 297/256.16, 256.1, 256.13, 256.14, 253
See application file for complete search history.

(56) References Cited

U.S. PATENT DOCUMENTS

| | | |
|---|---|---|
| 6,070,890 A | 6/2000 | Haut et al. |
| 8,388,063 B2 | 3/2013 | Fiore, Jr. et al. |
| 8,955,909 B2 | 2/2015 | Hisada et al. |
| 2012/0326474 A1 | 12/2012 | Williams et al. |
| 2014/0054939 A1 | 2/2014 | Hu |

FOREIGN PATENT DOCUMENTS

| | | |
|---|---|---|
| CN | 101096189 A | 1/2008 |
| CN | 201124778 Y | 10/2008 |
| EP | 2272709 A2 | 12/2011 |

OTHER PUBLICATIONS

Search Report in co-pending EP Appl. No. 14157642 dated May 2, 2014, cited in parent U.S. Appl. No. 14/195,927 (now U.S. Pat. No. 9,469,222 granted Oct. 18, 2016).

\* cited by examiner

CHILD SAFETY SEAT ASSEMBLY

CROSS-REFERENCE TO RELATED APPLICATION(S)

This Patent Application is a Divisional Application of U.S. patent application Ser. No. 14/195,927 filed on Mar. 4, 2014, which claims priority to U.S. provisional application No. 61/851,296 filed on Mar. 5, 2013, which are incorporated herein by reference.

BACKGROUND

1. Field of the Invention

The present invention relates to child safety seat assemblies.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. Therefore, safety legislations require the use of a child safety seat for seating a young child in a vehicle. The seatbelt of the vehicle can be used to secure the child safety seat which has a harness more adapted to restrain the young child.

The child safety seat can include a child seat and a base connected underneath the child seat. To facilitate the use of the child seat, attachment structures may be provided to allow the child seat to attach with and removed from the base as desired. The attachment structures generally have to be sufficiently robust to resist potential crash forces, while still easy to engage and disengage and economical to manufacture. Unfortunately, certain current designs of the attachment mechanisms may not be convenient to operate, and relatively complex in construction.

Therefore, there is a need for a child safety seat assembly that can be convenient to operate and address at least the foregoing issues.

SUMMARY

The present application describes child safety seat assemblies. In some embodiments, the child safety seat assembly can include a support base, and a child carrier operable to detachably assemble with the support base. The support base has a shell body that defines a receiving area and includes a support surface and an upright surface rising upward from the support surface, the shell body being assembled with a latch located adjacent to the upright surface. The child carrier includes a seat shell having a foot portion protruding downward, the foot portion having an interior in which are assembled a release arm and a fixed rod. The foot portion is placed on the support surface in the receiving area and the latch engages with the rod when the child carrier is locked with the support base, and the release arm is operable to push the latch to disengage from the rod for removal of the child carrier from the support base.

DETAILED DESCRIPTION OF THE EMBODIMENTS

Figure 1:
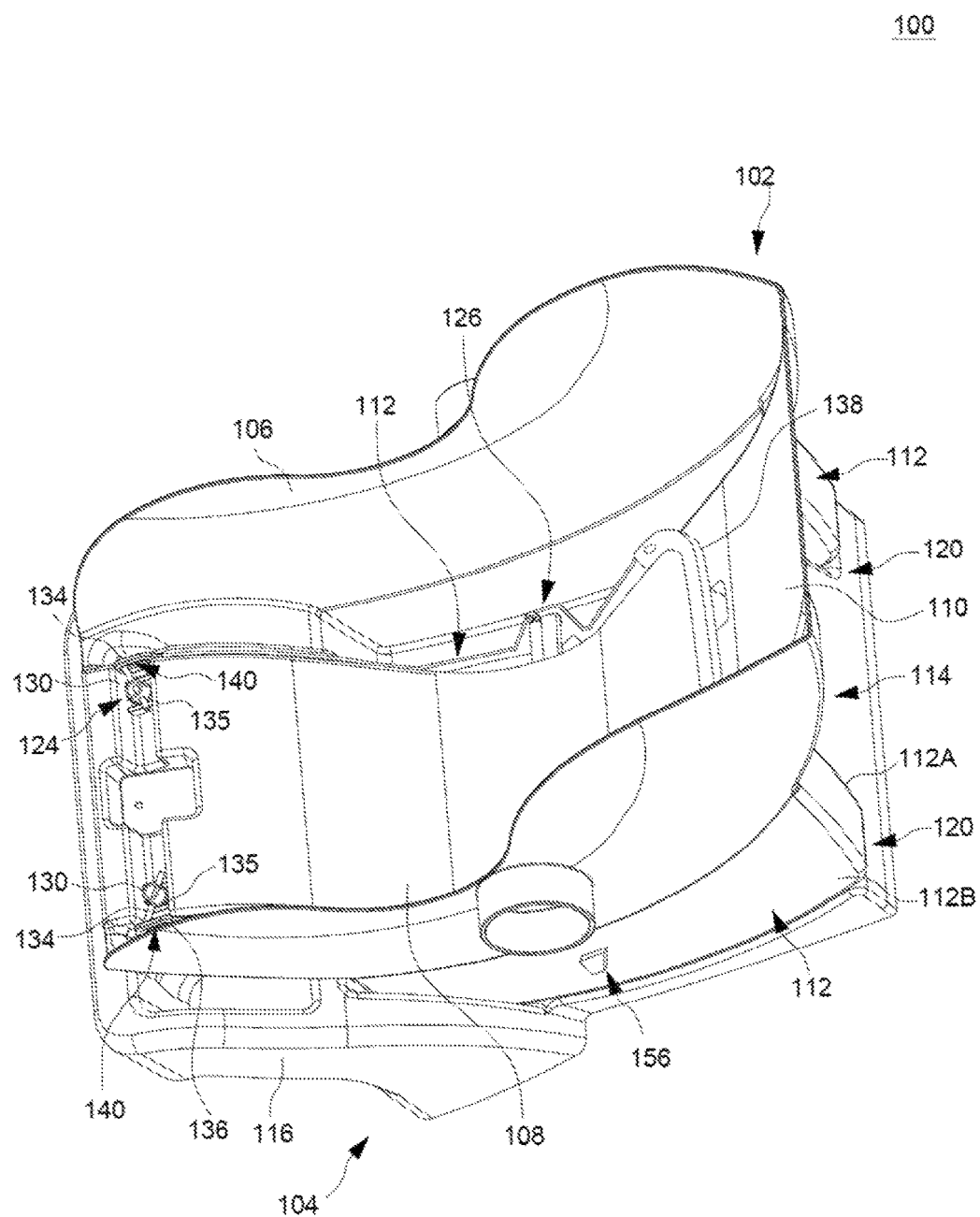
FIG. 1 is a schematic view illustrating one embodiment of a child safety seat assembly.
Figure 2:
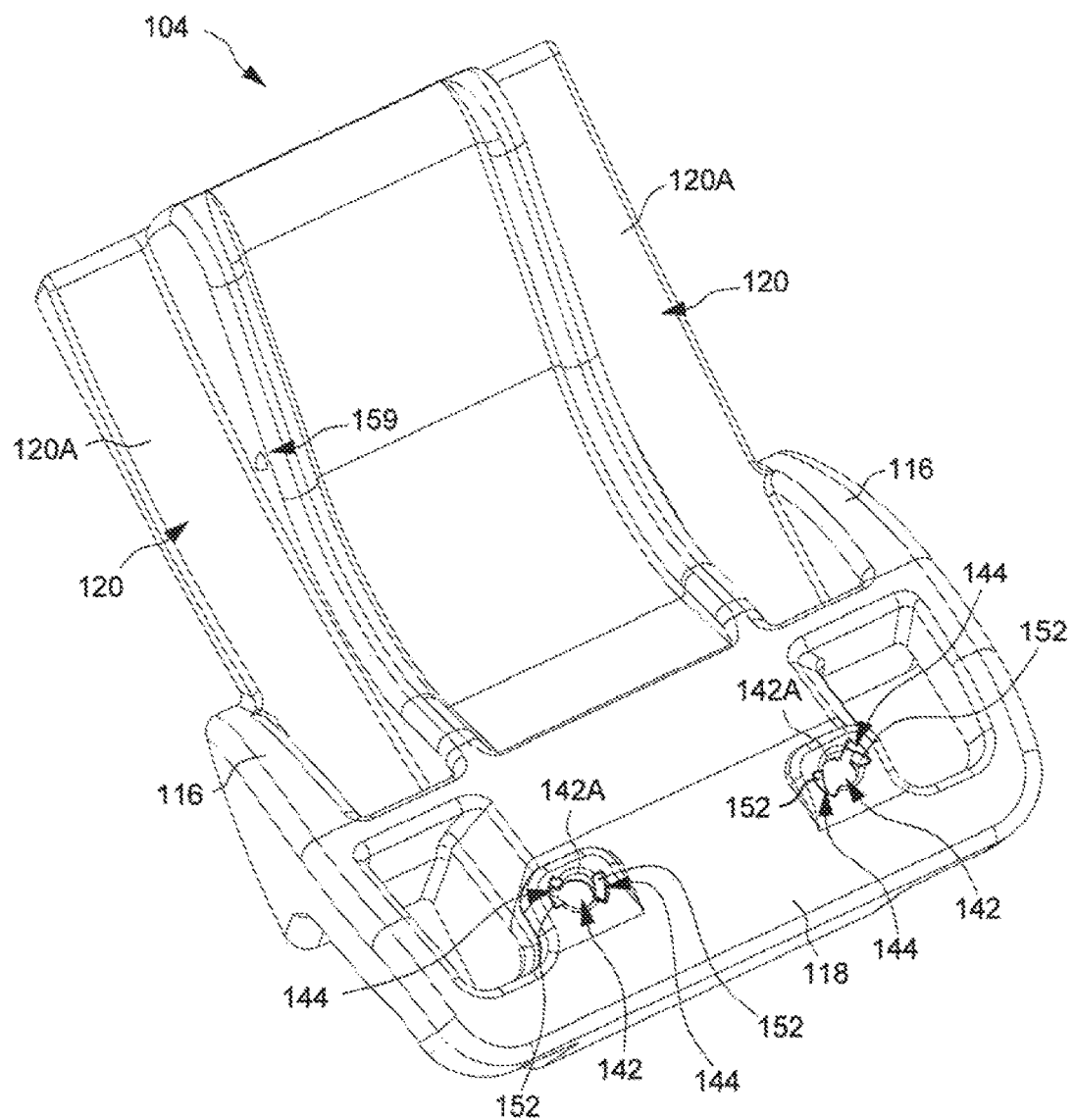
FIG. 2 is a schematic view illustrating one embodiment of a support base used as a support structure in the child safety seat assembly.

FIG. 1 is a perspective view illustrating one embodiment of a child safety seat assembly 100, and FIG. 2 is a schematic view illustrating a support base 104 of the child safety seat assembly 100. The child safety seat assembly 100 can include a child carrier 102, and a support base 104 used as a support structure. The child carrier 102 can include a seat shell 106 having a seat portion 108 and a seatback 110 configured to receive a child. The seat shell 106, including the seat portion 108 and the seatback 110, can be formed by plastic molding. An underside of the seat shell 106 can include two protruding foot portions 112, and a gap region 114 laterally delimited between the two foot portions 112. Each of the foot portions 112 can respectively have an inner side surface 112A facing the gap region 114, and an outer side surface 112B opposite to the inner side surface 112A. The foot portions 112 can be formed at the underside of the seat portion 108, and extend to the rear of the seatback 110. The support base 104 can include a shell body 116 having an upper surface provided with two receiving areas 120. When the child carrier 102 is installed on the upper surface of the support base 104, the foot portions 112 can respectively rest in the receiving areas 120.

The child carrier 102 can be removably installed with different support structures, e.g., the support structure can be the support base 104 for installation in a vehicle, or the support structure can be a stroller frame (not shown) on which the child carrier 102 can be used as a seat structure of the stroller apparatus. These different configurations of use can be implemented via an attachment mechanism that can be operable to fasten the child carrier 102 with either of the support base and the stroller frame. An embodiment of this attachment mechanism is described hereafter with reference to FIGS. 3-7.

Figure 3:
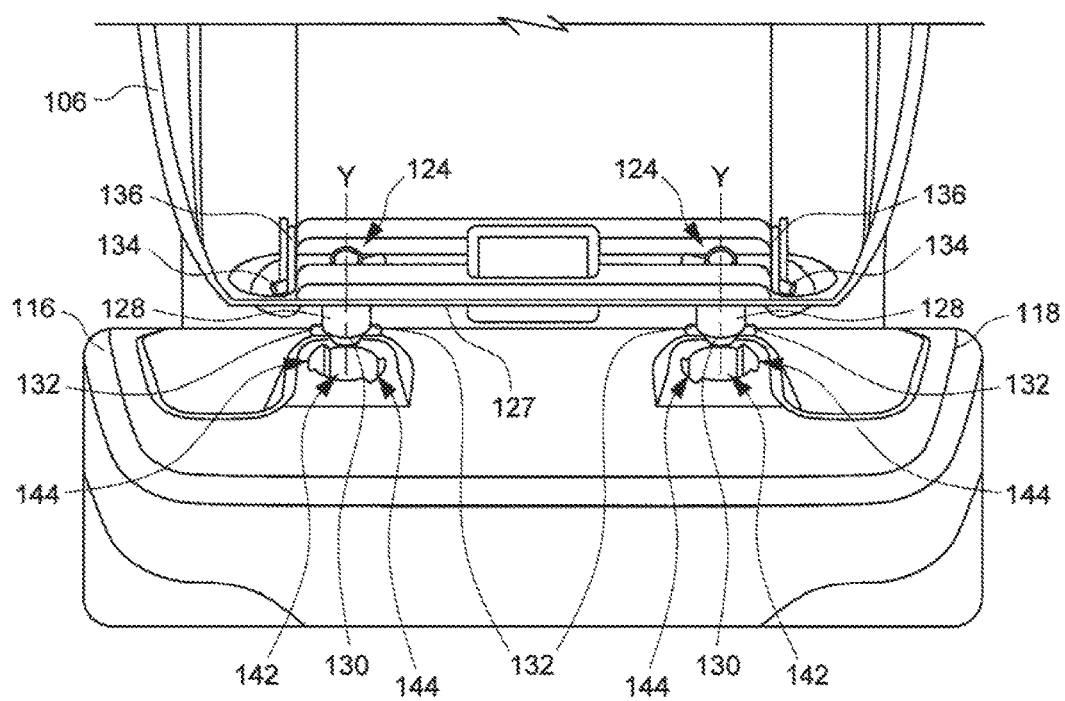
FIG. 3 is a schematic view illustrating the construction of a front attachment mechanism for fastening a child carrier with a support base in the child safety seat assembly.

In conjunction with FIGS. 1 and 2, FIG. 3 is a schematic view illustrating the construction of a front portion of the attachment mechanism for fastening the front of the child carrier 102 with the support base 104. The front portion of this attachment mechanism can include the assembly of two latches 124 near a front of the child carrier 102.

The seat shell 106 can have an outer surface 127 facing downward, and two columns 128 transversally spaced-apart from each other can respectively project vertically outward from the outer surface 127 at a region near the front of the child carrier 102. Each of the columns 128 can have an elongated shape extending downward from the outer surface 127, and can be pivotally assembled with one latch 124. For example, each column 128 can have a hollow interior through which one corresponding latch 124 can be pivotally assembled, the pivot axis of the latch 124 being aligned with a lengthwise axis Y of the corresponding column 128.

The two latches 124 are respectively insertable into two openings 142 formed on the upper surface 118 of the support base 104 to lock the child carrier 102 with the support base 104. The two latches 124 can be similar in construction, and can be arranged at two locations transversally spaced apart from each other near the front of the child carrier 102. For example, each latch 124 can include a stem 130 extending along the axis Y, and one or two radial projections 132 (two radial projections 132 are exemplary shown in the drawings) connected with the stem 130 and extending radially outward from an outer surface of the stem 130. The stem 130 can be arranged through the interior of the column 128 and project downward from the outer surface 127, and the two radial projections 132 can be located outside the column 128 and adjacent to a distal end of the column 128. Another portion of the stem 130 located inside the seat shell 106 can include a lever 134 projecting outward from the outer surface of the stem 130.

The two latches 124 can be respectively connected with two springs 135. The springs 135 can be torsion springs. For example, each spring 135 can wrap around the stem 130 of one associated latch 124, and have an end anchored with the seat shell 106. Each spring 135 can bias the corresponding latch 124 to rotate toward a locking state.

The seat shell 106 can further include a release actuating mechanism that is operable to turn the two latches 124 to an unlocking state. The release actuating mechanism can include two driving members 136 respectively arranged in the interior of the two foot portions 112. Each of the driving members 136 can be formed integrally as one elongated part that is movable along the interior of the foot portion 112. The two driving members 136 can be respectively connected with the two latches 124 at a front end, and with a release actuator 138 at a rear end. More specifically, each driving member 136 can have a front end portion provided with a slot 140 through which the lever 134 of the corresponding latch 124 can be assembled, and a rear end portion connected with the release actuator 138. The release actuator 138 can have an actuating portion exposed and accessible from an outer rear surface of the child carrier 102 for operation. By pulling on the release actuator 138, the driving members 136 can concurrently slide relative to the seat shell 106 parallel to a longitudinal axis of the seat shell 106, which drives the latches 124 to rotate against the biasing force of the springs 135 to the unlocking state.

Referring to FIGS. 2 and 3, the two openings 142 are transversally spaced apart from each other, and are formed through the upper surface 118 of the shell body 116 near the front thereof. The two openings 142 can have a shape that can substantially mate with the shape of the columns 128, so that the columns 128 can be inserted and fit into the openings 142. For example, the two openings 142 can be formed as cylindrical holes, and the columns 128 can be cylinders that can fit into the cylindrical holes. It is understood that the openings 142 and the columns 128 may also be formed with any other shapes.

Figure 4:
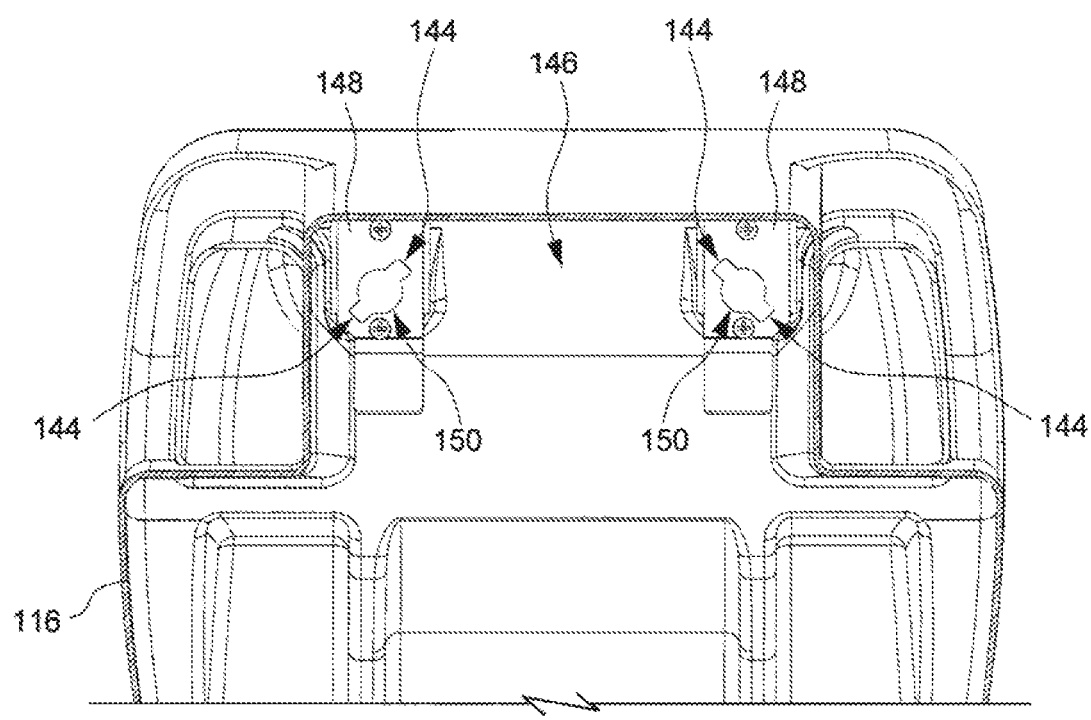
FIG. 4 is a schematic view illustrating an interior of the support base at a front portion thereof.

FIG. 4 is a schematic view illustrating an interior of the shell body 116 at a front portion thereof. Referring to FIGS. 2 and 4, each of the openings 142 can have a sidewall 142A in which is formed one or more slit 144 (two slits 144 are exemplary shown in the drawings) respectively associated with the one or more radial projection 132 of the latch 124. The slits 144 and the opening 142 can extend vertically, and downwardly communicate with a clearance 146 located below the upper surface 118 of the shell body 116. Reinforcing plates 148 can be affixed with the shell body 116 below the upper surface 118 at two locations respectively adjacent to the openings 142. Each of the reinforcing plate 148 can be cut to define a hole 150 matching with the envelop shape of the opening 142 provided with the slits 144.

A region of the support base 104 adjacently surrounding the upper rim of each opening 142 can further include one or more ramp surface 152 respectively associated with the one or more slit 144. Each ramp surface 152 can be formed as a sloped surface that extends downward and is adjacent to one corresponding slit 144.

Figure 5:
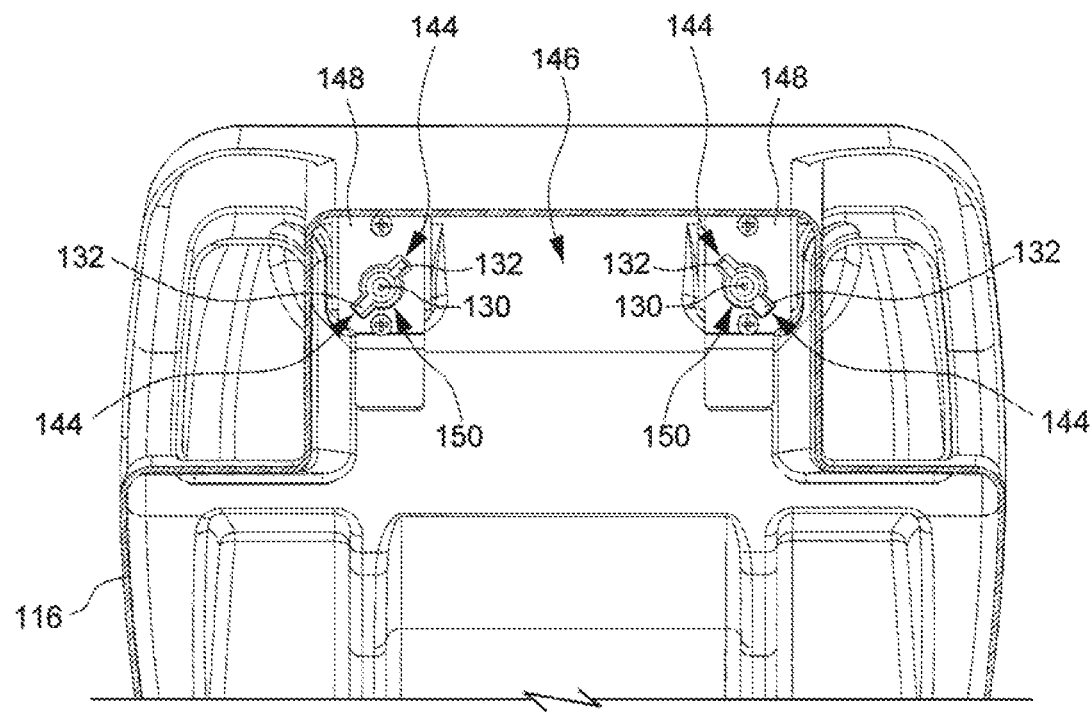
FIGS. 5 and 6 are schematic view illustrating exemplary operation of the front attachment mechanism for locking the child carrier with the support base.

In conjunction with FIGS. 1-4, FIGS. 5 and 6 are schematic view illustrating exemplary operation of the latches 124 for locking the child carrier 102 with the support base 104. When the child carrier 102 is installed on the support base 104, the child carrier 102 can be placed such that the columns 128 are respectively aligned with the openings 142 and the radial projections 132 respectively contact with the ramp surfaces 152. While they are in contact with the ramp surfaces 152, the radial projections 132 are respectively misaligned with respect to the slits 144. The child carrier 102 then can be lowered toward the support base 104. As a result, the respective sliding contact between the radial projections 132 and the ramp surfaces 152 can cause the latches 124 to self rotate against the biasing force of the springs 135 toward the corresponding slits 144. Through the interaction between the radial projections 132 and the ramp surfaces 152, the downward movement of the child carrier 102 thus can drive rotation the latches 124 toward the unlocking state. Once the radial projections 132 respectively align and engage with the slits 144 (as shown in FIG. 5), the latches 124 are in the unlocking state. The columns 128 and the latches 124 then can fully travel downward through the openings 142 and the slits 144. While the columns 128 travel downward, the engagement of the radial projections 132 in the slits 144 can prevent unlocking rotation of the latches 124.

Figure 6:
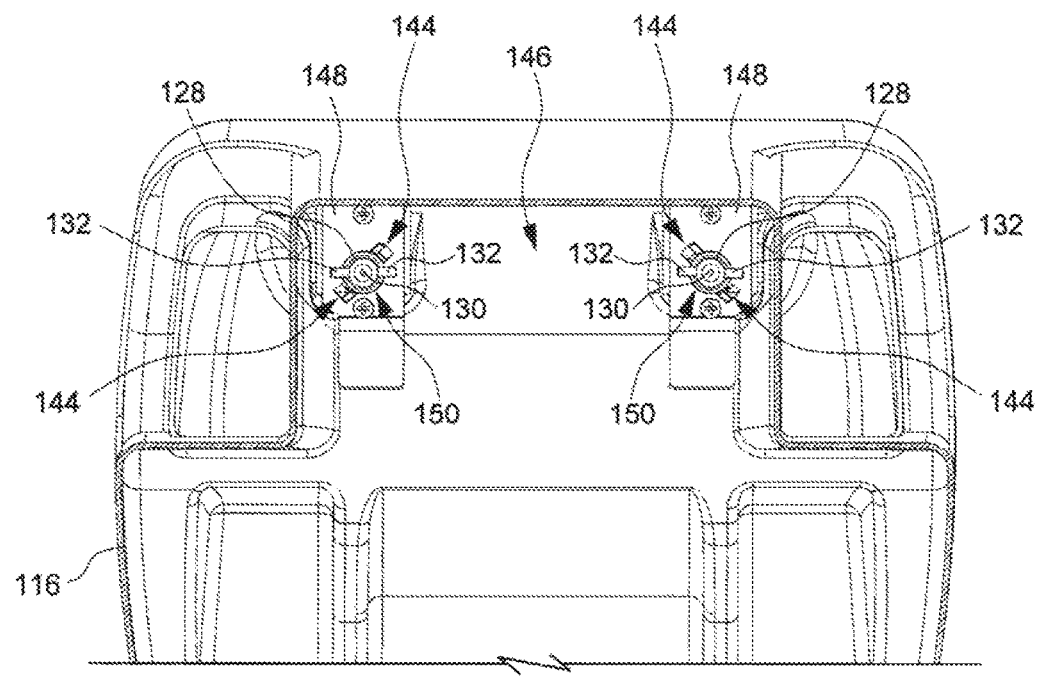

When the columns 128 are fully inserted, the radial projections 132 of each latch 124 respectively disengage from the slits 144 and enter the clearance 146 below the reinforcing plate 148. The biasing force applied by each spring 135 then can urge rotation of the corresponding latch 124 to the locking state, which causes the radial projections 132 to misalign with respect to the slits 144 (as shown in FIG. 6). As a result, the abutment of the radial projections 132 against the reinforcement plate 148 can prevent upward removal of the child carrier 102 from the support base 104. Moreover, the engagement of the columns 128 in the openings 142 can prevent horizontal displacement of the child carrier 102 relative to the support base 104.

For removing the child carrier 102 from the support base 104, the release actuator 138 can be pulled to cause rearward displacement of the driving members 136. The rearward displacement of the driving members 136 can drive the latches 124 in rotation about the respective axes Y to the unlocking state. Once the radial projections 132 are aligned with the slits 144, the child carrier 102 can be pulled upward away from the support base 104, which respectively removes the columns 128 from the openings 142.

Figure 7:
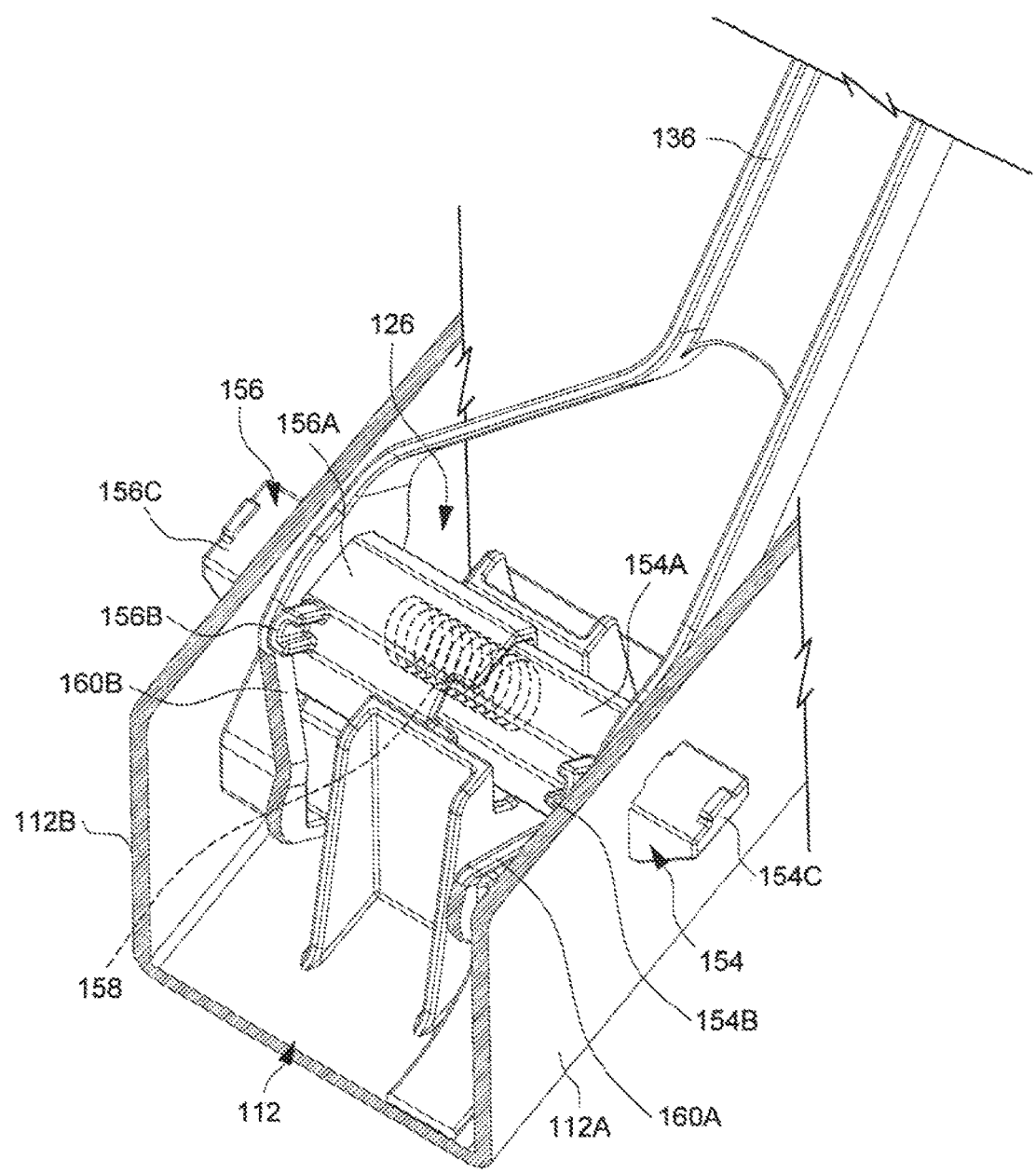
FIG. 7 is a schematic view illustrating a rear attachment mechanism for attaching a rear of the child seat with the support base.
Figure 8:
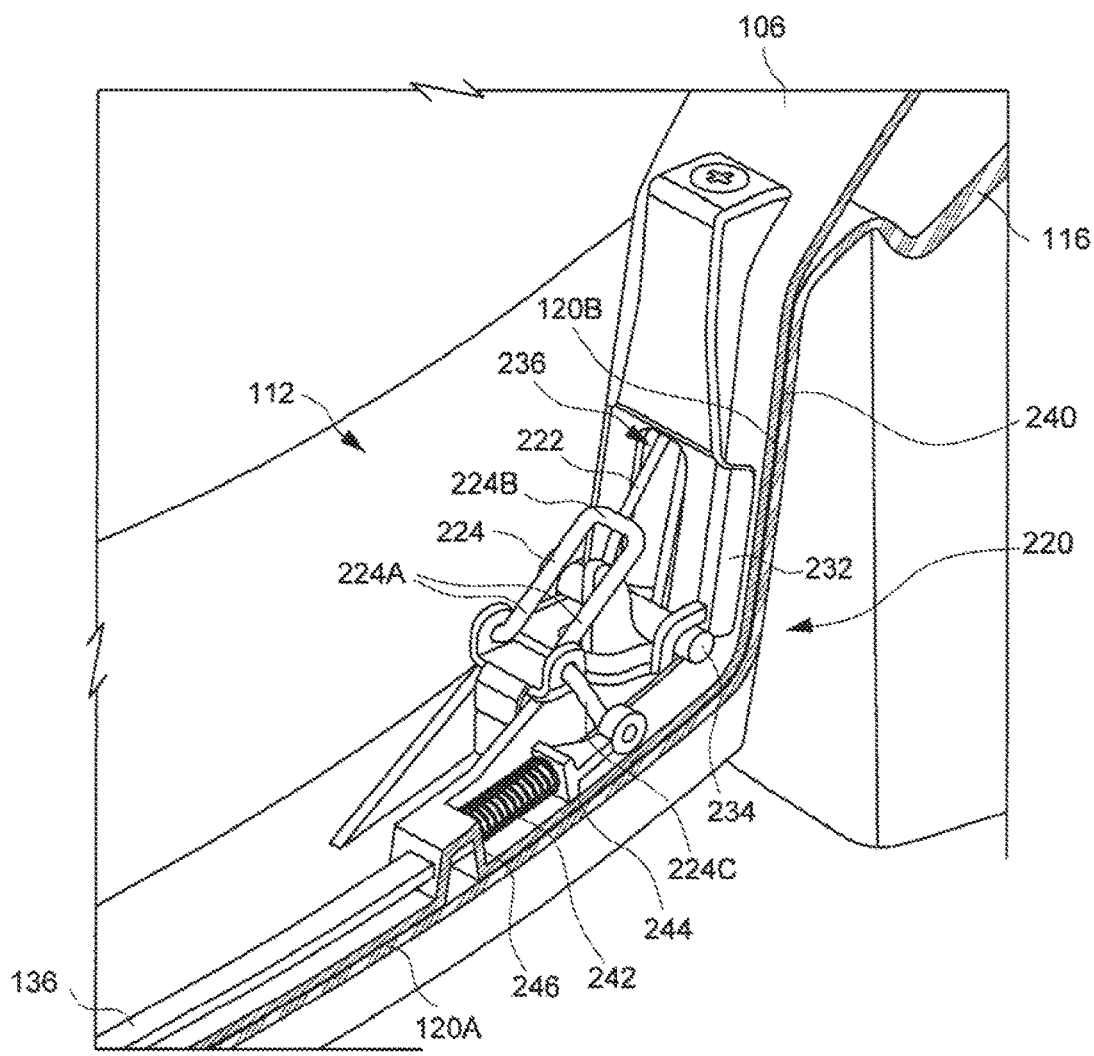
FIG. 8 is a schematic view illustrating another embodiment of a front attachment mechanism for fastening a child carrier with a support base.
Figure 9:
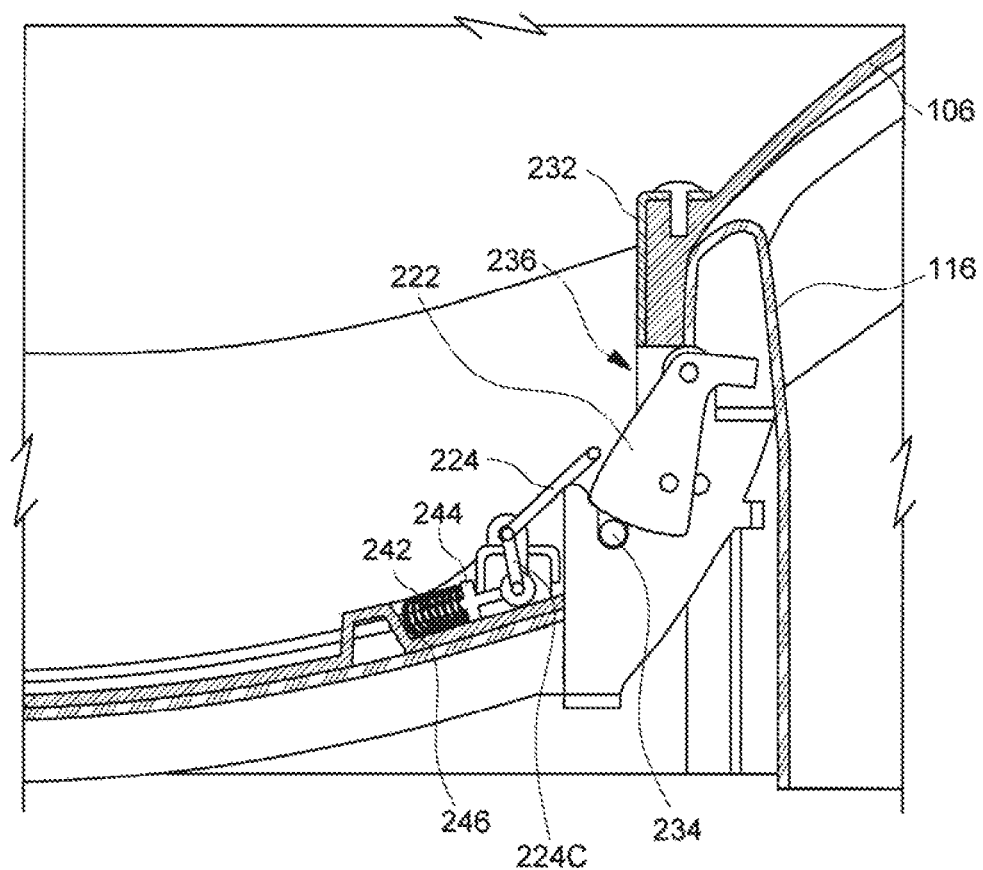
FIG. 9 is partial cross-sectional view illustrating the front attachment mechanism shown in FIG. 8.

In conjunction with FIGS. 1 and 2, FIG. 7 is a schematic view illustrating a rear portion of the attachment mechanism for attaching a rear of the child seat 102 with the support base 104. The rear portion of the attachment mechanism can include the assembly of two latching units 126 toward a rear of the child carrier 102. The two latching units 126 can be respectively assembled in the foot portions 112 of the seat shell 106, and have a similar construction. Each of the latching units 126 can include two latches 154 and 156 that are assembled through the interior of the corresponding foot portion 112, and are movable transversally relative to the seat shell 106 in opposite directions. The latch 154 can protrude outward through an opening on an inner surface 112A of the foot portion 112 that faces a central region of the seat shell 106, and the latch 156 can protrude outward through an opening on an outer surface 112B of the foot portion 112 facing an outside of the seat shell 106. The latches 154 and 156 can have respective sleeve portions 154A and 156A that are telescopically assembled with each other inside the foot portion 112. The respective outer surfaces of the sleeve portions 154A and 156A can respectively include protruding ribs 154B and 156B. A spring 158 (shown with phantom lines) having two ends respectively connected with the latches 154 and 156 can be assembled in the interior of the sleeve portions 154A and 156A. The spring 158 can bias the latches 154 and 156 to the locking state, so that the engaging ends 154C and 156C thereof respectively project outward from the inner and outer surface 112A and 112B of the foot portion 112. The ribs 154B and 156B can be in sliding contact with two slanted surfaces 160A and 160B provided in one driving member 136 extending along the foot portion 112.

When the child carrier 102 is used in combination with the support base 104, the engaging end 154C of the latch 154 can engage with an opening 159 (as better shown in FIG. 2) on the support base 104 for locking the child carrier 102 with the support base 104. When the child carrier 102 is used in combination with a stroller apparatus, the engaging end 156C of the latch 156 can engage with the stroller frame for locking the child carrier 102 in place.

For removing the child carrier 102 from either of the support base 104 and the stroller frame, the release actuator 138 (better shown in FIG. 1) can be pulled to cause rearward displacement of the driving members 136. Owing to the sliding contact between the ribs 154B and 156B and two slanted surfaces 160A and 160B, the rearward displacement of the driving members 136 can concurrently drive the latches 154 and 156 of each latching unit 126 to slide transversally toward the interior of the foot portion 112 to disengage from the support base 104 or stroller frame.

With the aforementioned attachment mechanism, the child carrier 102 and the support base 104 can be fastened with each other via four attachment points comprised of the two latches 124 near the front and the two latching units 126 near the rear. Moreover, the latching units 126 at the rear can also integrate the latches 156 used for installing the child carrier 102 on a stroller frame.

It is worth noting that the latches 124 provided at the front of the child carrier 102 may also lock with a stroller having a structure like the support base 104 described previously. In particular, the stroller may include a structure having openings 142, slits 144, clearance 146, reinforcement plates 148 and ramp surfaces 152, which may interact with the latches 124 as previously described to lock the child carrier 102 with the stroller. Accordingly, the child safety seat assemblies described herein can also use the latches 124 to lock the child carrier 102 with different support structures such as the support base 104 or a stroller.

It is also worth noting that certain embodiments may also implement the latches 124 at the front of the child carrier 102 without the latching units 126 at the rear of the child carrier 102. In other embodiments, the latches 124 at the front of the child carrier 102 may be implemented in combination with other constructions of the latching units at the rear of the child carrier 102.

FIG. 8-11 are schematic views illustrating another embodiment that uses two fastening assemblies 220 in replacement of the latches 124 previously described for attaching the front of the child carrier 102 with the support base 104. The two fastening assemblies 220 are similar in construction, and can be configured to respectively attach the two front ends of the foot portions 112 in the two receiving areas 120 of the support base 104.

Each of the fastening assemblies 220 can include a latch 222 connected with the shell body 116 of the support base 104, and a release arm 224 assembled with the seat shell 106 near the front of the child carrier 102. When the child carrier 102 is installed on the support base 104, the latch 222 can be operable to engage with the child carrier 102 for locking the child carrier 102 in place. The release arm 224 can be operable to urge displacement of the latch 222 from the locking state to the unlocking state for allowing removal of the child carrier 102 from the support base 104.

Figure 10:
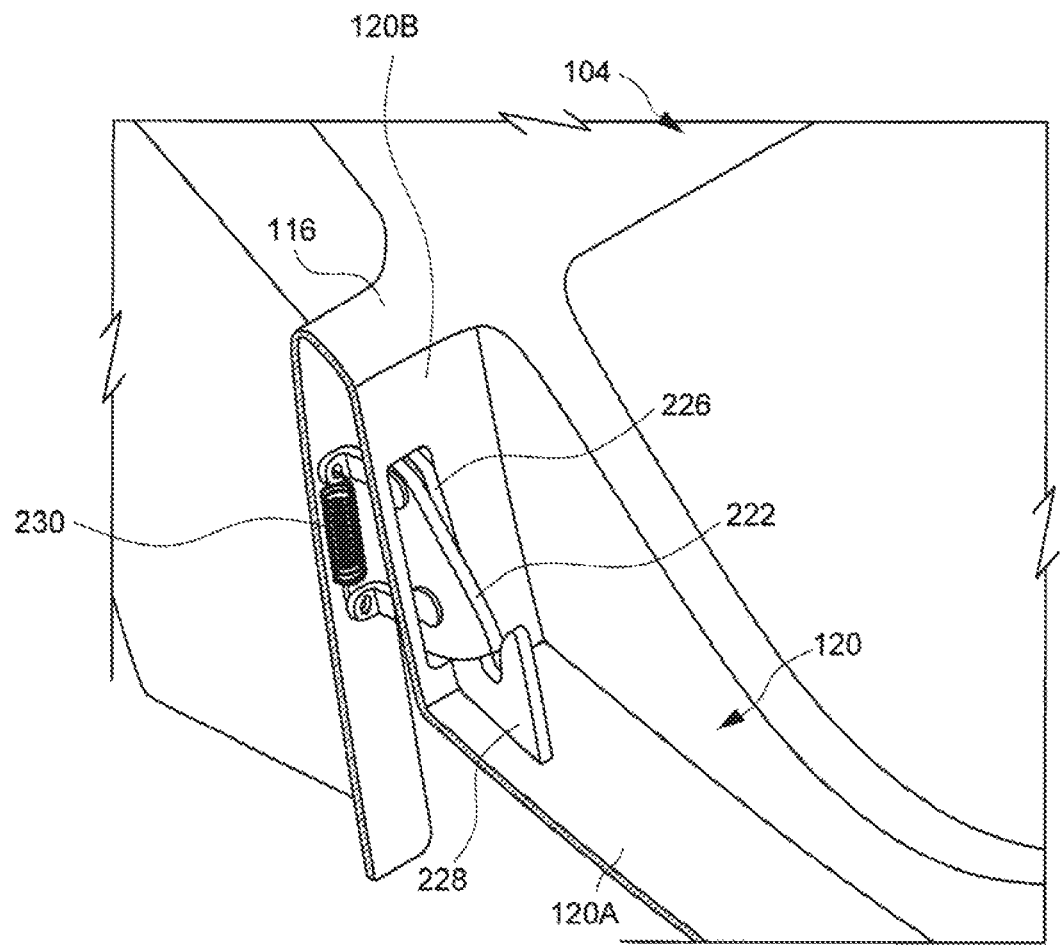
FIG. 10 is a schematic view illustrating the assembly of a latch with the support base used in the front attachment mechanism shown in FIG. 8.

FIG. 10 is a schematic view illustrating the assembly of the latch 222 with the shell body 116. The latch 222 can be arranged adjacent to one receiving area 120 associated therewith. The latch 222 can be pivotally assembled with a mount frame 226 that is affixed with the shell body 116 of the support base 104. The mount frame 226 can be formed as steel plate having a slotted portion 228 opened upward that is exposed outward in the receiving area 120 of the shell body 116. In one embodiment, the receiving area 120 can include a support surface 120A on which the foot portion 112 can rest when the child carrier 102 is installed on the support base 104, and an upright surface 120B that rises upward from the support surface 120A can define an end of the receiving area 120 along a lengthwise direction thereof. The mount frame 226 and the latch 222 can be arranged adjacent to the upright surface 120B. The latch 222 can pivot relative to shell body 116 between a locking state in which the latch 222 projects outward through the upright surface 120B and upwardly closes the slotted portion 228, and an unlocking state in which the latch 222 retracts toward the interior of the shell body 116 and upwardly opens the slotted portion 228. A spring 230 can have two ends respectively connected with the mount frame 226 and the latch 222. The spring 230 can bias the latch 222 toward the locking state for closing the slotted portion 228 of the mount frame 226.

Figure 11:
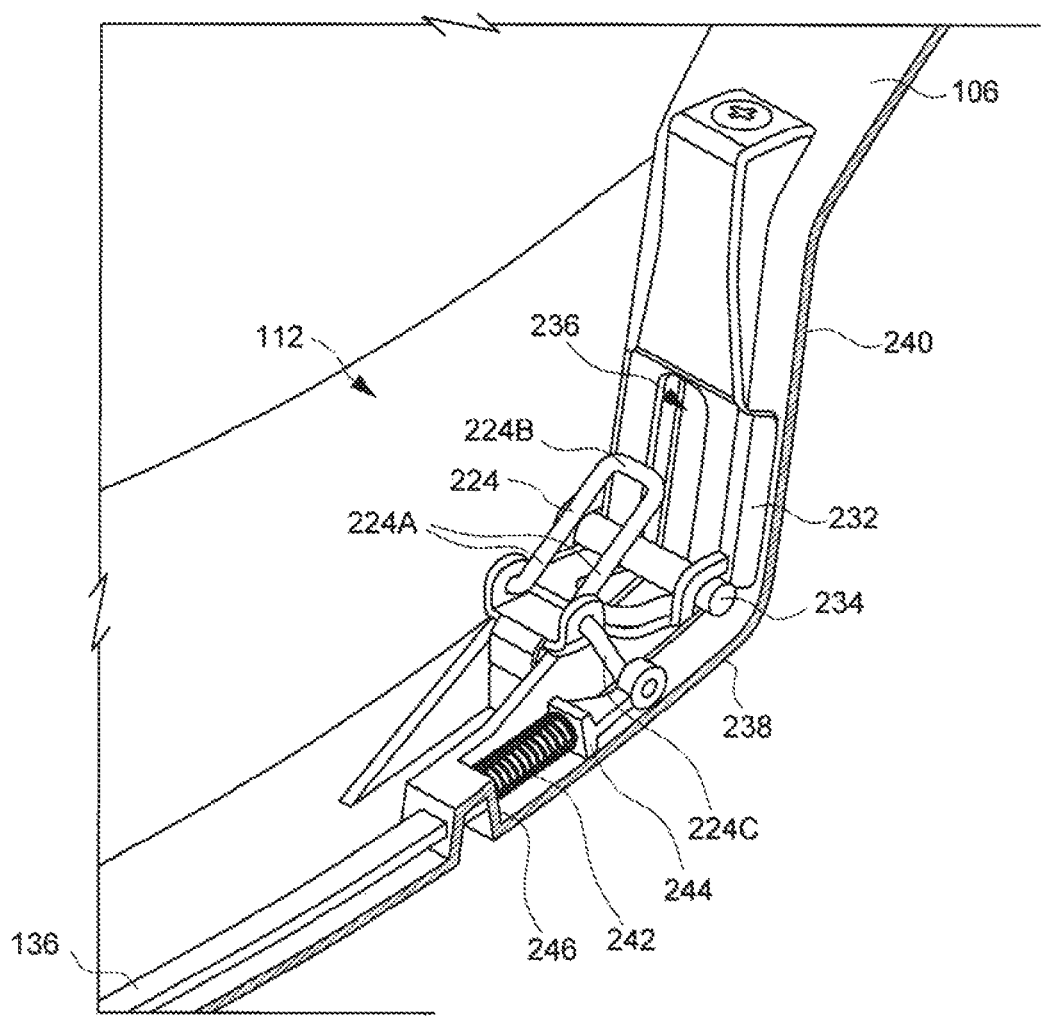
FIG. 11 is a schematic view illustrating the assembly of a release arm with the child carrier used in the front attachment mechanism shown in FIG. 8.

FIG. 11 is a schematic view illustrating the assembly of the release arm 224 with the seat shell 106. The release arm 224 can be pivotally connected with a bracket 232 that is affixed with the seat shell 106 in the interior of the foot portion 112. In one embodiment, the release arm 224 can have a U-shape including two side segments 224A and a middle segment 224B connected between the two side segments 224A. The release arm 224 can further include a bent extension 224C that extends downward. The bent extension 224C of the release arm 224 can be pivotally connected with a front portion of the driving member 136 that is arranged in the foot portion 112. Like previously described, the driving member 136 can have a rear end that is connected with the release actuator 138 (such as exemplary shown in FIG. 1) accessible from a rear of the child carrier 102 for operation. The release arm 224, including the segments 224A and 224B and the bent extension 224C, can be formed as one integral piece.

The bracket 232 can be affixed with a rod 234 that is disposed spaced apart from the pivot axis of the release arm 224, and extends transversally across an opening 236 formed the foot portion 112. The foot portion 112 can include a bottom surface 238 and a front upright surface 240 rising upward from the bottom surface 238, and the opening 236 can be cut through the bottom surface 238 and the front upright surface 240.

In operation, the release arm 224 can rotate toward and away from the rod 234. More specifically, a rearward displacement of the driving member 136 toward the rear of the child carrier 102 can drive the release arm 224 to rotate toward the rod 234, and a spring 242 may be provided to bias the release arm 224 to rotate away from the rod 234. In one embodiment, the spring 242 may exemplary have two ends respectively connected with a flange 244 formed on the driving member 136 and a rib 246 provided in the foot portion 112 of the seat shell 106. When no pulling force is applied on the release actuator 138, the spring 242 can thereby bias the driving member 136 forward so as to cause the release arm 224 to rotate to an initial position away from the rod 234.

Exemplary operation of each fastening assembly 220 is described hereafter with reference to FIGS. 8-11. For installing the child carrier 102 on the support base 104, the child carrier 102 can be placed such that the foot portions 112 are respectively received in the receiving areas 120 of the support base 104 and the front upright surfaces 240 of the foot portions 112 respectively lie adjacent to the upright surfaces 120B. Moreover, the slotted portion 228 of each mount frame 226 can partially travel through the opening 236 of the corresponding foot portion 112, and the rod 234 can be received in the slotted portion 228. Once the rod 234 is fully inserted in the slotted portion 228, the spring 230 can urge the latch 222 to the locking state: the latch 222 can thereby travel through the opening 236 on the front upright surface 240 into the interior of the foot portion 112 to upwardly close the slotted portion 228 and engage with the rod 234. Accordingly, the latch 222 can restrainedly keep the rod 234 in the slotted portion 228 and block upward removal of the child carrier 102 from the support base 104.

It is noted that while the child carrier 102 is installed on the support base 104, the release arm 224 is kept in its initial position away from the rod 234 owing to the biasing action by the spring 242. Accordingly, the release arm 224 does not interfere with the engagement of the latch 222 over the rod 234.

For removing the child carrier 102 from the support base 104, the release actuator 138 (such as exemplary shown in FIG. 1) can be pulled to cause rearward displacement of the driving members 136. The rearward displacement of each driving member 136 can respectively drive rotation of the release arm 224 toward the rod 234 that is received in the slotted portion 228. As a result, the release arm 224 (in particular the middle segment 224B thereof) can push the latch 222 to move against the biasing force of the spring 230. Being urged in displacement by the release arm 224, the latch 222 can rotate from the locking state to the unlocking state for disengaging from the rod 234. It is noted that while it travels toward the rod 234, the release arm 224 can straddle the slotted portion 228. Once the latch 222 is in the unlocking state, the child carrier 102 can be lifted from the support base 104, which removes the rod 234 from the slotted portion 228.

Advantages of the structures described herein include the ability to attach a child carrier with a support structure through multiple attachment points. The attachment points can include two front latches having a same construction, and two rear latching units having a construction different from the front latches. The four latches can be conveniently driven to release via two driving members connected with a release actuator accessible from a rear of the child carrier.

Realizations of the child safety seat assemblies have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat assembly comprising:
    a support base having a shell body that defines a receiving area and includes a support surface and an upright surface rising upward from the support surface, the shell body being assembled with a latch located adjacent to the upright surface; and
    a child carrier operable to detachably assemble with the support base, the child carrier including a seat shell having a foot portion protruding downward, the foot portion having an opening and an interior in which are assembled a release arm and a fixed rod, the latch of the support base being movable through the opening into the interior of the foot portion for engaging with the rod when the child carrier is installed on the support base;
    wherein the foot portion is placed on the support surface in the receiving area and the latch engages with the rod when the child carrier is locked with the support base, and the release arm is operable to push the latch to disengage from the rod for removal of the child carrier from the support base.

2. The child safety seat assembly according to claim 1, wherein the receiving area has a lengthwise direction, and the upright surface defines an end of the receiving area along the lengthwise direction.

3. The child safety seat assembly according to claim 1, wherein the rod extends across the opening of the foot portion.

4. The child safety seat assembly according to claim 1, wherein the foot portion has a bottom surface, and a second upright surface rising upward from the bottom surface, and the opening extends through the bottom surface and the second upright surface of the foot portion.

5. The child safety seat assembly according to claim 4, wherein the foot portion is placed in the receiving area of the support base with the second upright surface of the foot portion positioned adjacent to the upright surface of the receiving area, when the child carrier is installed on the support base.

6. The child safety seat assembly according to claim 1, wherein the latch is pivotally connected with the shell body, and is biased by a spring toward a locking state for engaging with the rod.

7. The child safety seat assembly according to claim 1, wherein the shell body is affixed with a mount frame having a slotted portion, when the child carrier is installed on the support base, the rod is received in the slotted portion and the latch closes upwardly the slotted portion so as to restrainedly keep the rod in the slotted portion.

8. The child safety seat assembly according to claim 7, wherein the release arm when pushing the latch to disengage from the rod straddles the slotted portion.

9. The child safety seat assembly according to claim 7, wherein the interior of the foot portion includes a driving member that is connected with the release arm, the release arm being biased by a spring force to rotate away from the rod, and a rearward displacement of the driving member relative to the seat shell driving the release arm to rotate toward the rod.

10. The child safety seat assembly according to claim 9, wherein the driving member is connected with a release actuator that is assembled with the seat shell and is exposed at a rear of the child carrier.

11. The child safety seat assembly according to claim 1, wherein the release arm is disposed toward a front of the child carrier.

12. The child safety seat assembly according to claim 1, wherein the release arm is pivotally connected with the seat shell, the release arm being rotatable toward the rod for urging the latch to disengage from the rod.

13. A child safety seat assembly comprising:
a support base having a shell body that defines a receiving area and includes a support surface and a first upright surface rising upward from the support surface, the shell body being assembled with a latch located adjacent to the first upright surface, the shell body further being affixed with a mount frame having a slotted portion; and
a child carrier operable to detachably assemble with the support base, the child carrier including a seat shell having a foot portion protruding downward, and a release actuator assembled with the seat shell and exposed at a rear thereof, the foot portion having a bottom surface, and a second upright surface rising upward from the bottom surface at a front of the foot portion, the bottom surface and the second upright surface defining at least partially an interior of the foot portion in which are assembled a release arm and a fixed rod, the release arm being operatively connected with the release actuator;
wherein the foot portion is positioned in the receiving area with the bottom surface and the second upright surface respectively adjacent to the support surface and the first upright surface and the latch engaged with the rod when the child carrier is locked with the support base, the rod being received in the slotted portion and the latch closing upwardly the slotted portion so as to restrainedly keep the rod in the slotted portion when the child carrier is installed on the support base, and the release actuator is operable to cause movement of the release arm toward the rod such that the release arm pushes the latch to disengage from the rod for removal of the child carrier from the support base.

14. The child safety seat assembly according to claim 13, wherein the foot portion includes an opening extending through the bottom surface and the second upright surface, and the latch travels through the opening into the interior of the foot portion for locking engagement with the rod.

15. The child safety seat assembly according to claim 13, wherein the release arm is pivotally connected with the seat shell, the release arm being rotatable toward the rod for urging the latch to disengage from the rod.

16. The child safety seat assembly according to claim 13, wherein the latch is pivotally connected with the shell body, and is biased by a spring toward a locking state for engaging with the rod.

17. The child safety seat assembly according to claim 13, wherein the release arm when pushing the latch to disengage from the rod straddles the slotted portion.

18. The child safety seat assembly according to claim 13, wherein the interior of the foot portion further includes a driving member having an elongated shape that is oppositely connected with the release arm and the release actuator, the release arm being biased by a spring force to rotate away from the rod, and the release actuator being operable to cause a rearward displacement of the driving member relative to the seat shell that drives the release arm to rotate toward the rod.

* * * * *